(12) United States Patent
Yang

(10) Patent No.: US 8,199,541 B2
(45) Date of Patent: Jun. 12, 2012

(54) HIGH EFFICIENCY BRIDGELESS PFC POWER CONVERTER

(75) Inventor: Ta-Yung Yang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 219 days.

(21) Appl. No.: 12/416,944

(22) Filed: Apr. 2, 2009

(65) Prior Publication Data

US 2009/0256543 A1 Oct. 15, 2009

(51) Int. Cl.
*H02M 7/219* (2006.01)
*H02M 1/42* (2007.01)
*G05F 1/70* (2006.01)

(52) U.S. Cl. .......................................... 363/89; 323/207

(58) Field of Classification Search .................. 323/205, 323/207, 222, 223, 225; 363/79, 80, 81, 363/89, 127, 69, 70, 125
See application file for complete search history.

(56) References Cited

U.S. PATENT DOCUMENTS

| 7,164,591 | B2 * | 1/2007 | Soldano ........................... 363/89 |
| 7,215,560 | B2 * | 5/2007 | Soldano et al. .................. 363/44 |
| 7,269,038 | B2 * | 9/2007 | Shekhawat et al. ............. 363/71 |
| 7,630,221 | B2 * | 12/2009 | Sui et al. .......................... 363/70 |

* cited by examiner

*Primary Examiner* — Gary L Laxton
(74) *Attorney, Agent, or Firm* — Ming Chow Sinorica, LLC

(57) ABSTRACT

A bridgeless PFC power converter comprises a first inductor and a second inductor coupled from a first input-terminal and a second input-terminal to a first transistor and a second transistor. A first diode and a second diode are coupled from the first transistor and the second transistor to an output capacitor. A first capacitor and a second capacitor are coupled from the input-terminals to the ground terminal through a third transistor and a fourth transistor. A control circuit generates a first-switching signal and a second-switching signal to control the first transistor and the second transistor. The second-switching signal will turn on the second transistor when the first-switching signal switches the first transistor. The first-switching signal will turn on the first transistor when the second-switching signal switches the second transistor. The control circuit turns off the third transistor and the fourth transistor during the light-load of the PFC power converter.

17 Claims, 11 Drawing Sheets

US 8,199,541 B2

HIGH EFFICIENCY BRIDGELESS PFC POWER CONVERTER

BACKGROUND OF THE INVENTION

1. Field of Invention

The present invention relates to power converters, and more particularly, to the PFC power converters.

2. Description of Related Art

The purpose of Power Factor Correction (PFC) is to correct a line-input current of a power supply. The line-input current of the power supply corrected by PFC power converter generates a sinusoidal input current which is in phase with a line voltage. Most conventional PFC techniques incorporate a boost topology as shown in FIG. 1. The boost PFC power converter including a bridge rectifier has one MOSFET and five diodes. In addition, there are three semiconductor devices in the current conduction path. Therefore, the power consumption of the conventional PFC power converter is high so as to reduce circuit efficiency of the conventional PFC power converter.

SUMMARY OF THE INVENTION

The present invention provides a bridgeless PFC power converter with high efficiency and good EMI performance. As compared with the conventional PFC power converter, the bridgeless PFC power converter reduces the number of semiconductor devices in any given conduction path to reduce the power loss for improving the circuit efficiency. Furthermore, the bridgeless PFC power converter of the present invention senses an output of the power supply to provide a light-load signal to disconnect the EMI filter during a light-load of the PFC power converter for power saving.

The bridgeless PFC power converter according to the present invention comprises a first inductor coupled from a first input-terminal to a first transistor. A second inductor is coupled from a second input-terminal to a second transistor. A first diode is coupled from the first transistor to an output capacitor. A second diode is coupled from the second transistor to the output capacitor. The first transistor, the second transistor and the output capacitor are further coupled to a ground terminal. A control circuit is coupled to the output capacitor, first input-terminal and the second input terminal to receive a feedback signal, a first-input signal and a second-input signal. The control circuit is coupled to the first transistor and the second transistor for detecting a first-current signal and a second-current signal. The control circuit generates a first-switching signal and a second-switching signal to control the first transistor and the second transistor in response to the feedback signal, the first-input signal, the second-input signal, the first-current signal and the second-current signal. The second-switching signal will turn on the second transistor when the first-switching signal switches the first transistor, and the first-switching signal will turn on the first transistor for achieving high efficiency when the second-switching signal switches the second transistor.

Further, the bridgeless PFC power converter of the present invention further comprises a first capacitor coupled from the first input-terminal to the ground terminal through a third transistor. A second capacitor is coupled from the second input-terminal to the ground terminal through a fourth transistor. The control circuit further generates a light-load signal to turn off the third transistor and the fourth transistor for saving power during the light-load of the PFC power converter. Besides, the first transistor and the second transistor are sense transistors. Each sense transistor has a sense-terminal to output a current signal, the magnitude of the current signal is corrected to a current flowed through the sense transistor.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
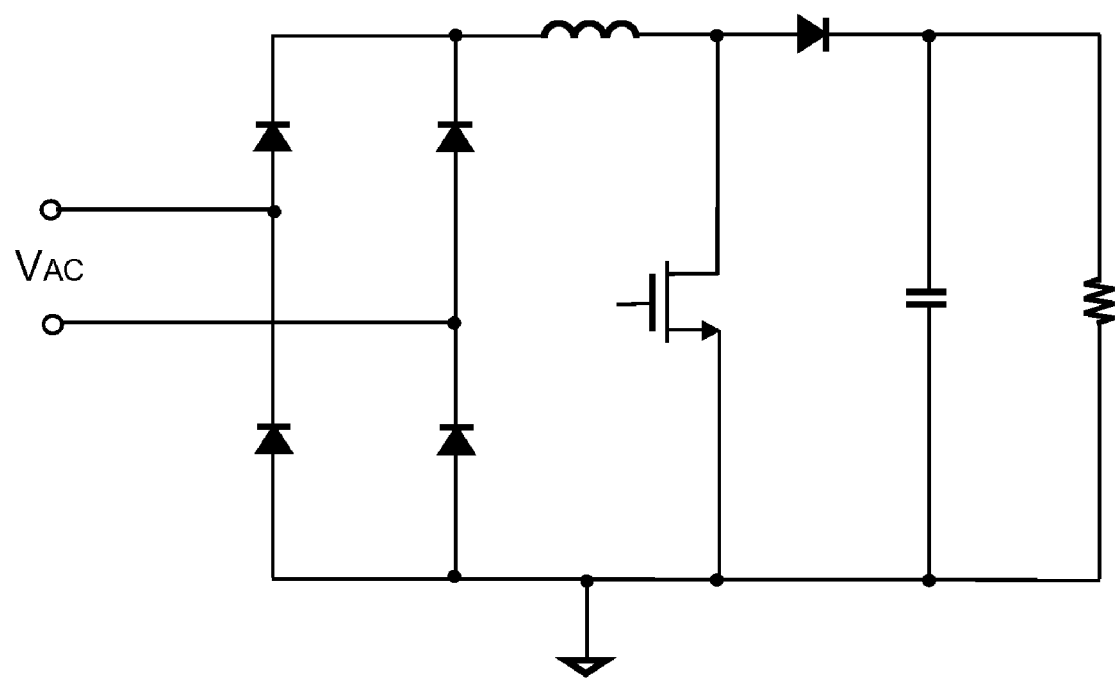
FIG. 1 shows the circuit schematic of a conventional PFC power converter.
Figure 2:
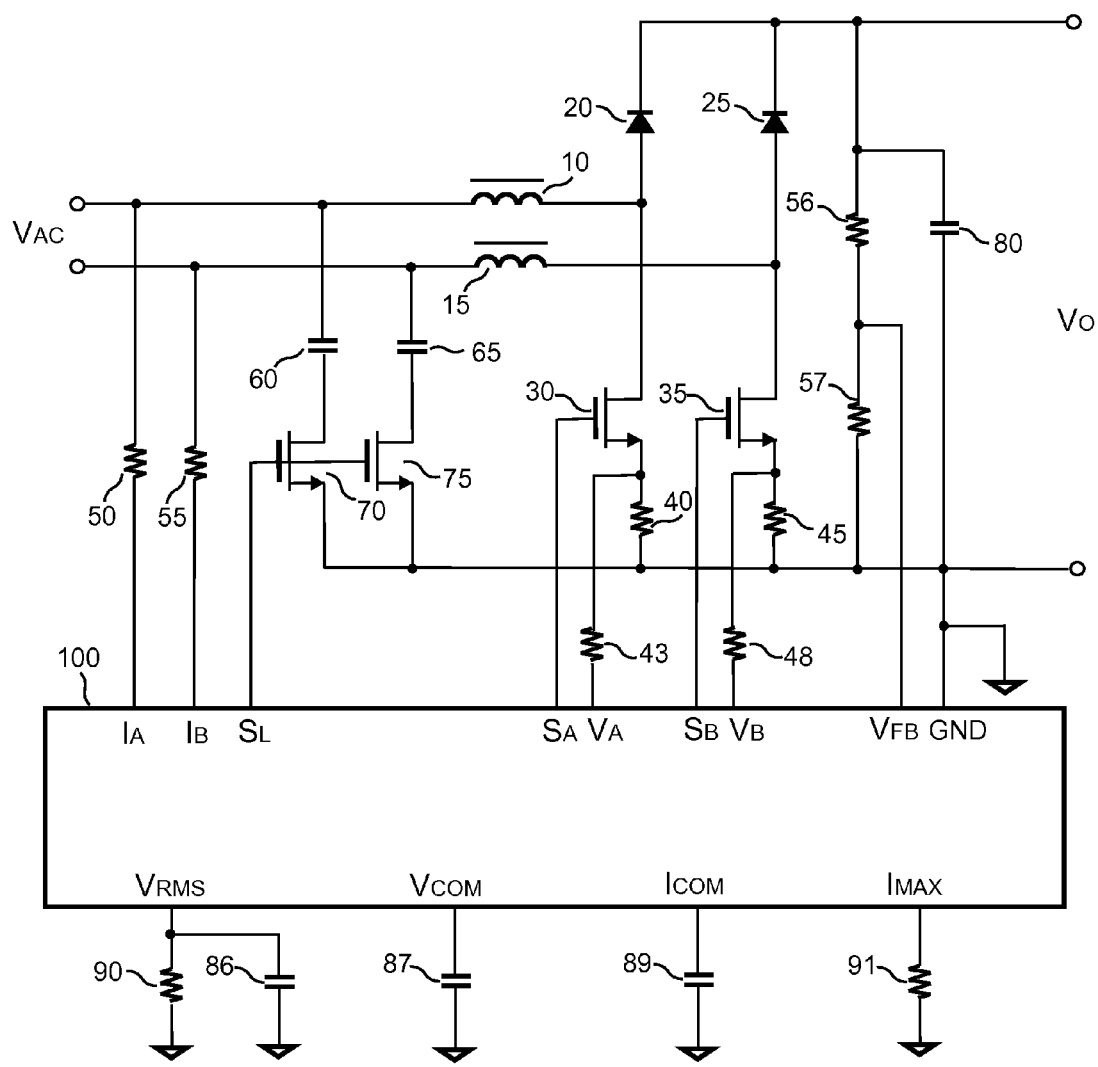
FIG. 2 shows the circuit schematic of a preferred embodiment of a bridgeless PFC power converter according to the present invention.

FIG. 2 shows the circuit schematic illustrating one embodiment of a PFC (Power Factor Correction) power converter according to the present invention. It includes a first inductor 10 coupled from a first input-terminal to a first transistor 30. A second inductor 15 is coupled from a second input-terminal to a second transistor 35. The first input-terminal and the second input-terminal receive an input voltage $V_{AC}$. A first diode 20 is coupled from the first transistor 30 to an output capacitor 80. The output capacitor 80 is further coupled between an output terminal of power converter and a ground terminal for outputting an output voltage $V_O$. A second diode 25 is coupled from the second transistor 35 to the output capacitor 80. The first transistor 30 and the second transistor 35 are further coupled to the ground terminal. A first capacitor 60 is coupled from the first input-terminal to the ground terminal through a third transistor 70. A second capacitor 65 is coupled from the second input-terminal to the ground terminal through a fourth transistor 75. The first capacitor 60 and the second capacitor 65 are used for reducing EMI, particularly for attenuating the common mode noise.

A control circuit 100 is coupled to the output capacitor 80 to receive a feedback signal $V_{FB}$ through a voltage divider having two resistors 56 and 57. The resistors 56 and 57 are connected in series and coupled between the output terminal of the power converter and the ground terminal. The control circuit 100 is further coupled to the first input-terminal and the second input terminal through resistors 50 and 55 to receive a first-input signal $I_A$ and a second-input signal $I_B$ respectively. The first-input signal $I_A$ and the second-input signal $I_B$ are correlated to the input voltage $V_{AC}$. Through resistors 43 and 48, the control circuit 100 is connected to the first transistor 30 and the second transistor 35 for detecting a first-current signal $V_A$ and a second-current signal $V_B$. The resistors 43 and 48 are coupled to the first transistor 30 and the second transistor 35 to generate the first-current signal $V_A$ and the second-current signal $V_B$. Two resistors 40 and 45 are coupled from the first transistor 30 and the second transistor 35 to the ground terminal respectively.

Figure 10:
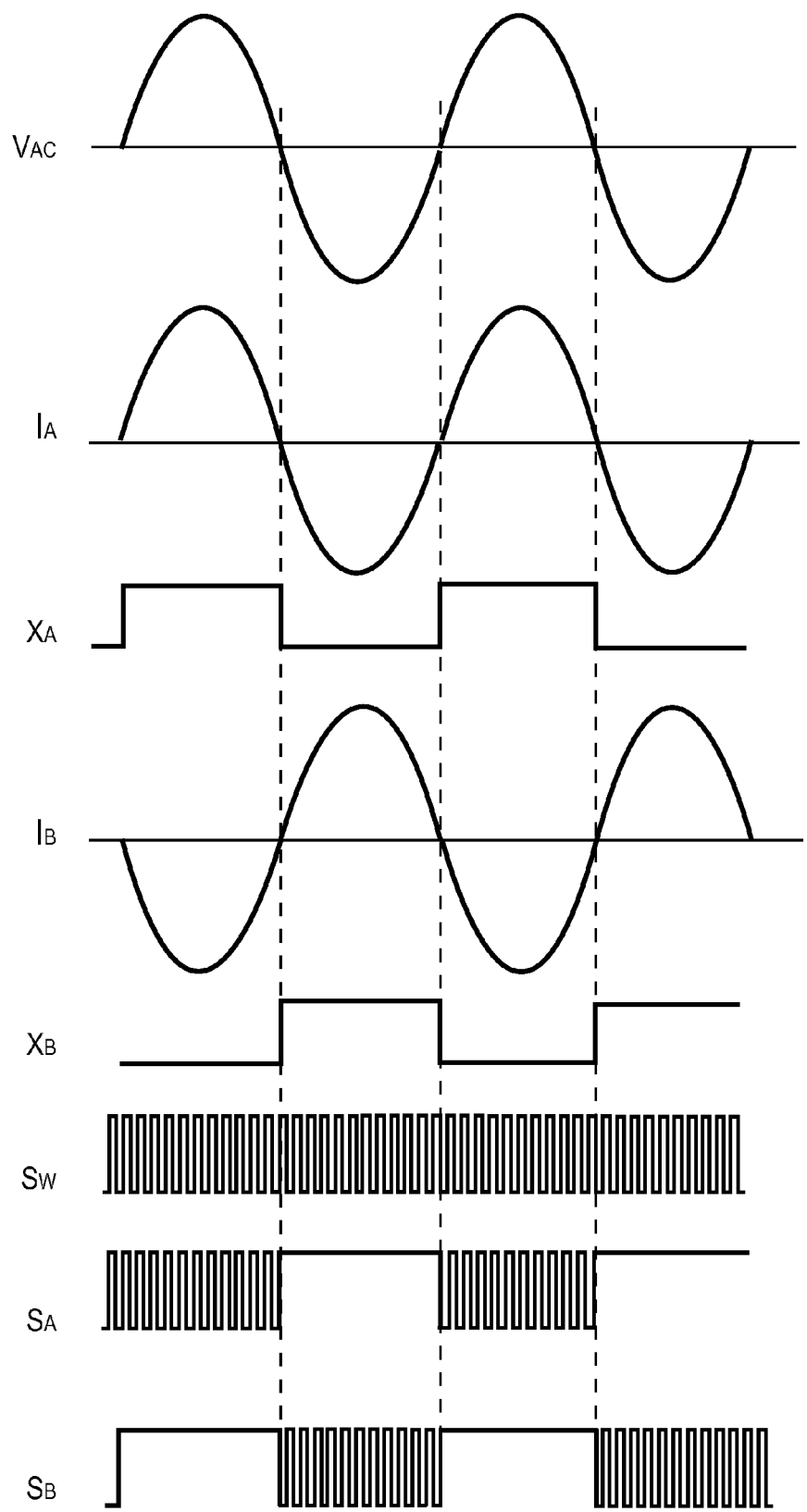
FIG. 10 shows the signal waveforms according to the present invention.

The control circuit 100 generates a first-switching signal $S_A$ and a second-switching signal $S_B$ to control the first transistor 30 and the second transistor 35 in response to the feedback signal $V_{FB}$, the first-input signal $I_A$, the second-input signal $I_B$, the first-current signal $V_A$ and the second-current signal $V_B$. As shown in FIG. 10, when the first-switching signal $S_A$ switches the first transistor 30 in response to a switching signal $S_W$, the second-switching signal $S_B$ will turn on the second transistor 35. The switching signal $S_W$ is a PWM signal. The first-switching signal $S_A$ will turn on the first transistor 30 for achieving higher efficiency when the second-switching signal $S_B$ switches the second transistor 35 in response to the switching signal $S_W$.

Furthermore, for saving power at a light-load of the PFC power converter, the control circuit 100 generates a light-load signal $S_L$ to turn off the third transistor 70 and the fourth transistor 75 during the light-load of the PFC power converter. The control circuit 100 is further coupled to capacitors 86, 87, 89 and resistors 90 and 91 and generates an input signal $V_{RMS}$, an error signal $V_{COM}$, a signal $I_{COM}$ and a programmable signal $I_{MAX}$ respectively.

Figure 3:
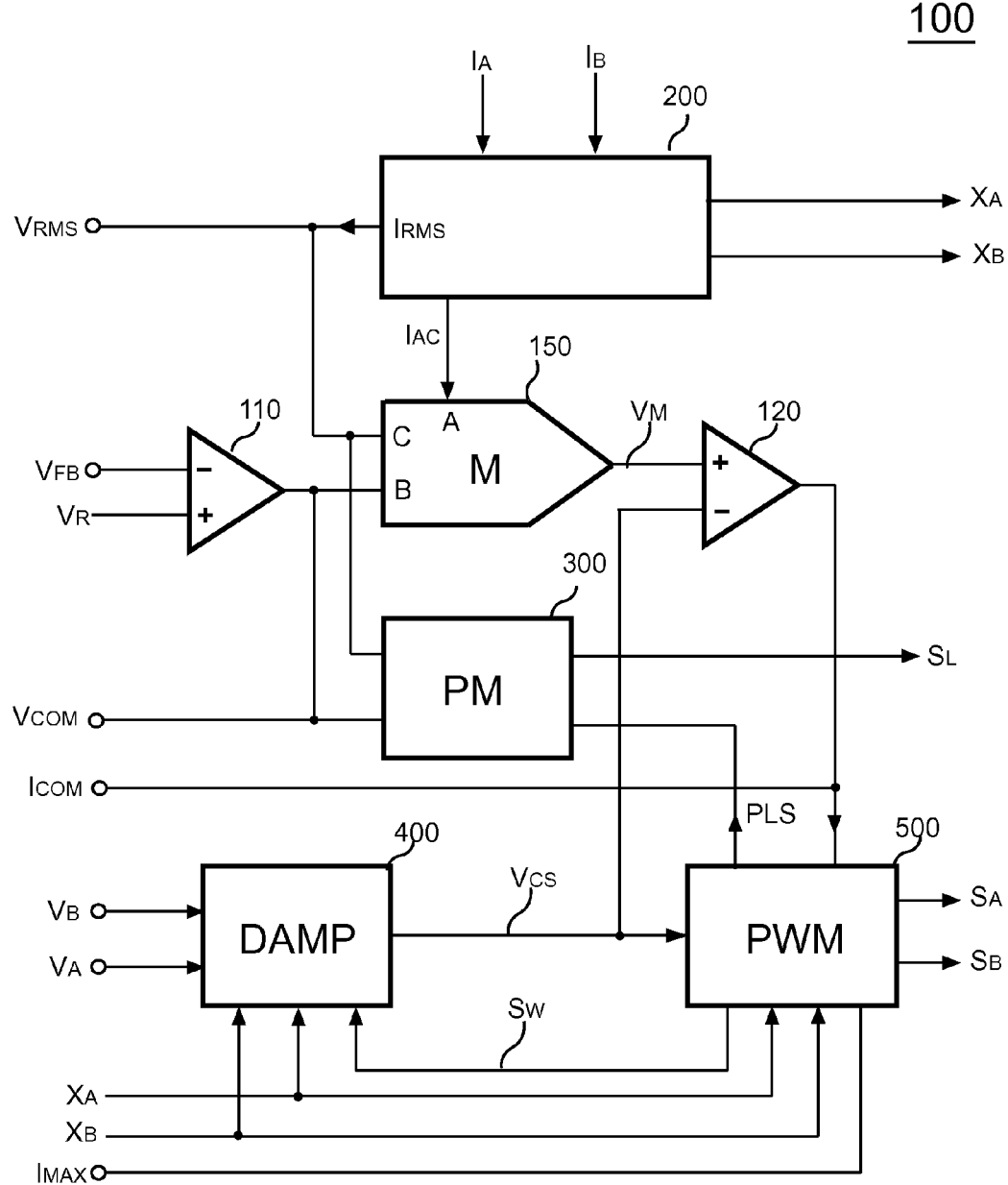
FIG. 3 shows the circuit schematic of a preferred embodiment of the control circuit according to the present invention.

FIG. 3 shows the circuit schematic illustrating one embodiment of the control circuit 100 according to the present invention. The control circuit 100 includes an arbiter circuit 200 generating a line-input signal $I_{AC}$, an signal $I_{RMS}$, a first-enable signal $X_A$ and a second-enable signal $X_B$ in accordance with the first-input signal $I_A$ and the second-input signal $I_B$. The input signal $V_{RMS}$ is correlated to the signal $I_{RMS}$, the capacitance of the capacitors 86 and the resistance of the resistor 90. A positive input terminal and a negative input terminal of a voltage amplifier 110 receive a reference signal $V_R$ and the feedback signal $V_{FB}$ respectively. The voltage amplifier 110 compares the feedback signal $V_{FB}$ with the reference signal $V_R$ for generating the error signal $V_{COM}$ at an output terminal of the voltage amplifier 110. It means that the error signal $V_{COM}$ is generated by the feedback signal $V_{FB}$ and the reference signal $V_R$. A multiplier-divider circuit (M) 150 is developed to generate a multiplier signal $V_M$. The line-input signal $I_{AC}$ (A terminal), the error signal $V_{COM}$ (B terminal) and the input signal $V_{RMS}$ (C terminal) are transmitted to the multiplier-divider circuit 150 to generate the multiplier signal $V_M$. The skill of generating the multiplier signal $V_M$ has been disclosed in a prior art of "Switched charge multiplier-divider" by Yang, et al., U.S. Pat. No. 6,812,769.

The multiplier signal $V_M$ is transmitted to a positive input terminal of an operational amplifier 120 to compare with a current signal $V_{CS}$ received by a negative input terminal of the operational amplifier 120. An output terminal of the operational amplifier 120 will generate the signal $I_{COM}$. The signal $I_{COM}$ is transmitted to a PWM circuit 500 for generating the switching signal $S_W$. Thus, the PWM circuit 500 will generates the switching signal $S_W$ in accordance with the error signal $V_{COM}$, the current signal $V_{CS}$ and the input signal $V_{RMS}$.

Figure 5:
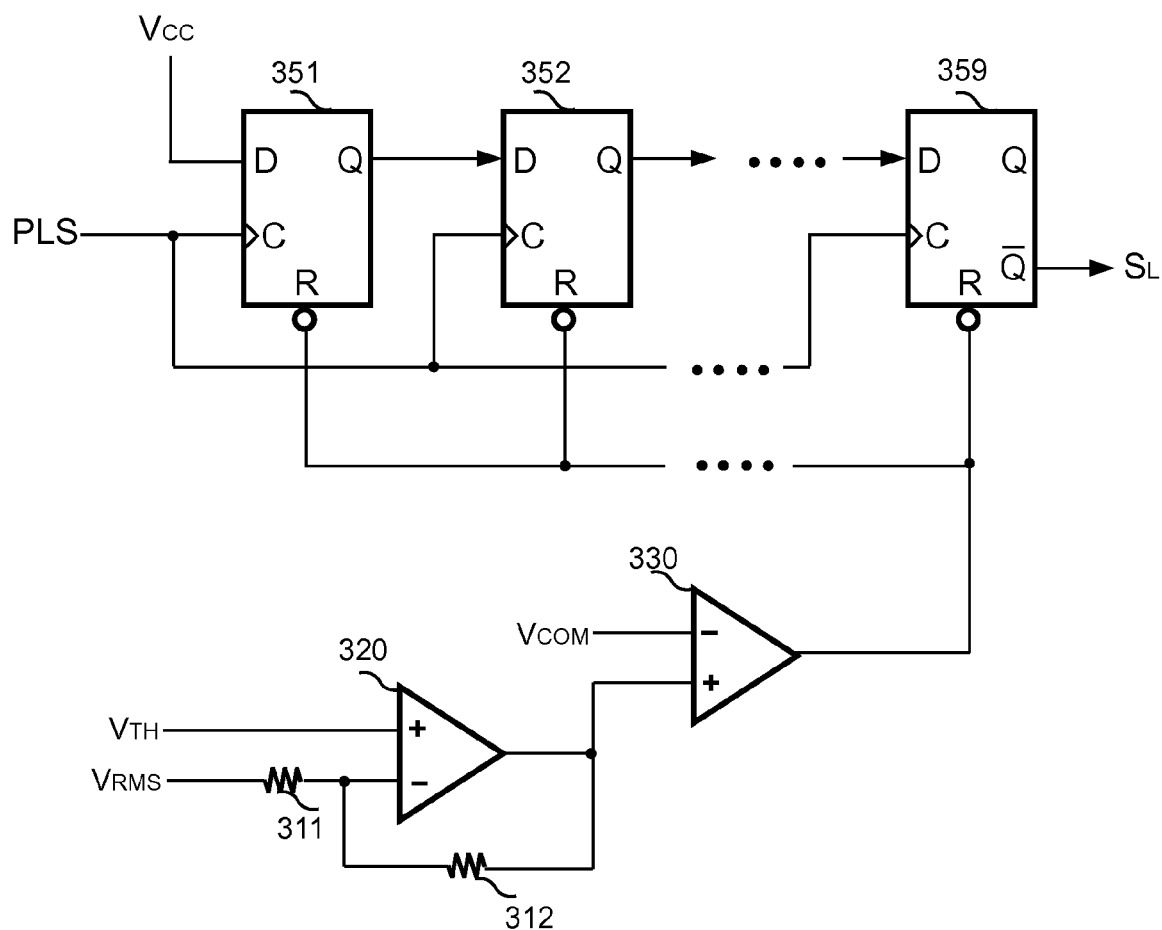
FIG. 5 shows the circuit schematic of a preferred embodiment of the power management circuit according to the present invention.

A power management circuit (PM) 300 is utilized to generate the light-load signal $S_L$ in response to the error signal $V_{COM}$ and the input signal $V_{RMS}$. The power management circuit 300 further receives the pulse signal PLS generated by the PWM circuit 500. The light-load signal $S_L$ is generated by comparing the error signal $V_{COM}$ with a threshold signal $V_{TH}$ (as shown in FIG. 5). The threshold signal $V_{TH}$ is programmed by the input signal $V_{RMS}$, which shown in FIG. 5.

Figure 8:
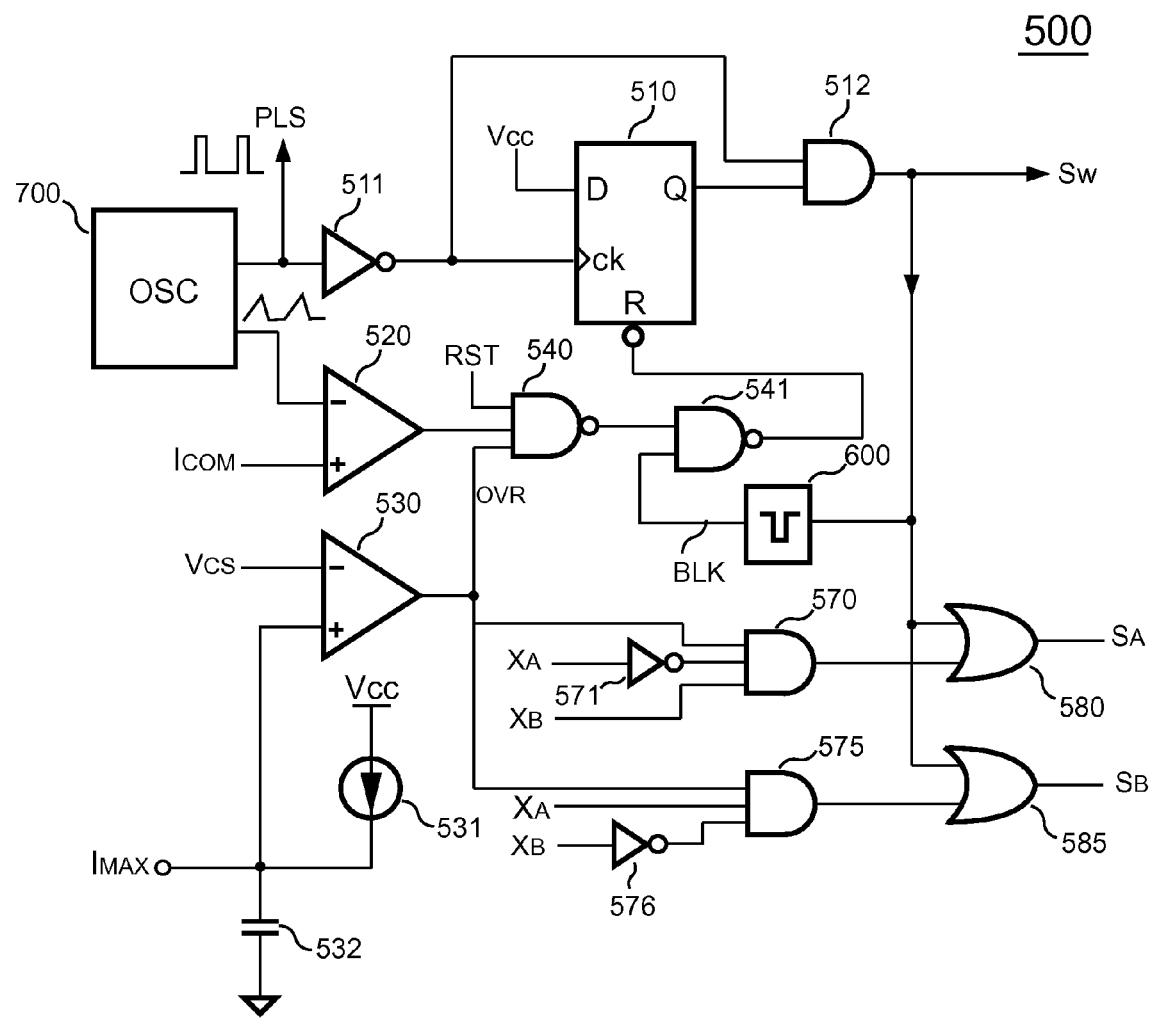
FIG. 8 shows the circuit schematic of a preferred embodiment of the PWM circuit according to the present invention.

Further, the PWM circuit 500 receives the switching signal $S_W$, the first-enable signal $X_A$ and the second-enable signal $X_B$ to generate the first-switching signal $S_A$ and the second-switching signal $S_B$ (shown in FIG. 8). Moreover, the PWM circuit 500 generates the programmable signal $I_{MAX}$ (shown in FIG. 8). Additionally, the control circuit 100 includes a differential amplifier (DAMP) 400. The differential amplifier 400 receives the first-current signal $V_A$, the second-current signal $V_B$, the switching signal $S_W$, the first-enable signal $X_A$ and the second-enable signal $X_B$. The differential amplifier 400 generates the current signal $V_{CS}$ in response to the first-current signal $V_A$ and the second-current signal $V_B$ (shown in FIG. 6).

Figure 4:
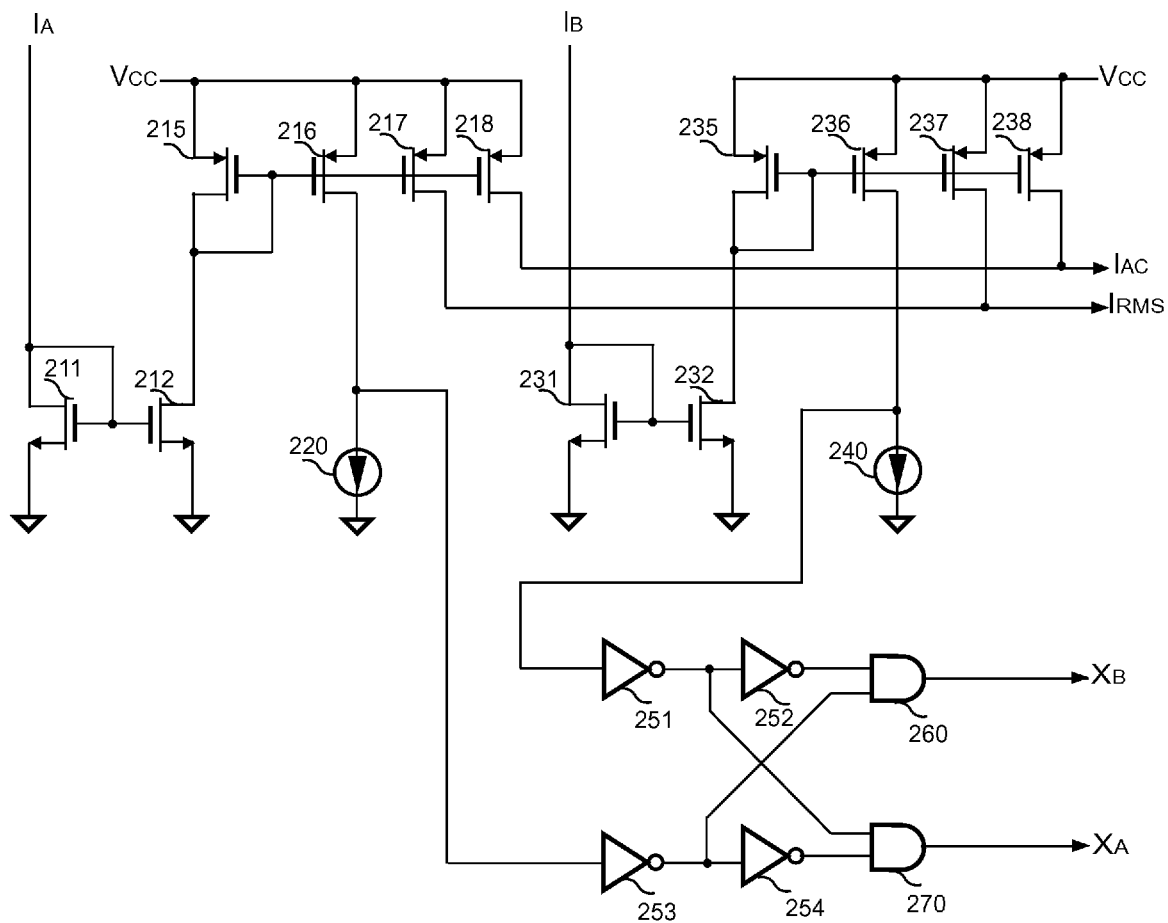
FIG. 4 shows the circuit schematic of a preferred embodiment of the arbiter circuit according to the present invention.

FIG. 4 shows the circuit schematic illustrating one embodiment of the arbiter circuit 200 according to the present invention. As shown, the arbiter circuit 200 includes a plurality of current mirrors having transistors 211, 212, 215, 216, 217, 218, 231, 232, 235, 236, 237 and 238. A first current mirror includes the transistors 211 and 212 for receiving the first-input signal $I_A$ and mirroring the first-input signal $I_A$. A second current mirror is coupled to the transistor 212. The second current mirror includes the transistors 215 and 216. A third current mirror includes the transistors 215 and 217. The third current mirror is coupled to the transistor 212. A fourth current mirror includes the transistors 215 and 218. The fourth current mirror is coupled to the transistor 212. A fifth current mirror includes the transistors 231 and 232. The fifth current mirror receives the second-input signal $I_B$ to mirror the second-input signal $I_B$. A sixth current mirror includes the transistors 235 and 236 and is coupled to the transistor 232 of the fifth current mirror. A seventh current mirror includes the transistors 235 and 237. The seventh current mirror is coupled to the transistor 232 of the fifth current mirror. The transistor 217 of the third current mirror and the transistor 237 of the seventh current mirror are utilized to generate the signal $I_{RMS}$. An eighth current mirror includes the transistors 235 and 238. The eighth current mirror is coupled to the transistor 232 of the fifth current mirror. The transistor 218 of the fourth current mirror and the transistor 238 of the eighth current mirror are utilized to generate the line-input signal $I_{AC}$.

The arbiter circuit 200 further includes a first threshold 220, a second threshold 240, a plurality of inverters 251, 252, 253, 254 and two AND gates 260 and 270 to generate the first-enable signal $X_A$ and second-enable signal $X_B$. The first threshold 220 is coupled to the transistor 216 of the second current mirror. The second threshold 240 is coupled to the transistor 236 of the sixth current mirror. The arbiter circuit 200 generates the first-enable signal $X_A$ when the first-input signal $I_A$ is higher than the first threshold 220. The arbiter circuit 200 generates the second-enable signal $X_B$ once the second-input signal $I_B$ is higher than the second threshold 240. The first-enable signal $X_A$ and the second-enable signal $X_B$ are exclusive. The first threshold 220 and the second threshold 240 can be current sources according to one embodiment of the present invention.

As shown, an input terminal of the inverter 251 is coupled to the transistor 236 of the sixth current mirror and the second threshold 240. An input terminal of the inverter 253 is coupled to the transistor 216 of the second current mirror and the first threshold 220. An output terminal of the inverter 251 is coupled to an input terminal of the inverter 252 and a first input terminal of the AND gate 270. An output terminal of the inverter 253 is coupled to an input terminal of the inverter 254 and a second input terminal of the AND gate 260. An output terminal of the inverter 252 is coupled to a first input terminal of the AND gate 260. An output terminal of the AND gate 260 generates the second-enable signal $X_B$. An output terminal of the inverter 254 is coupled to a second input terminal of the AND gate 270. An output terminal of the AND gate 270 generates the first-enable signal $X_A$.

FIG. 5 shows the circuit schematic illustrating one embodiment of the power management circuit 300 according to the present invention. As shown, the power management circuit 300 includes a plurality of flip-flops 351~359 to generate the light-load signal $S_L$. The flip-flops 351~359 are coupled in series. The input terminal D of the flip-flops 351 receives a supply voltage $V_{CC}$. The output terminals Q of the flip-flops 351~358 is coupled to the input terminals D of the flip-flops 352~359 respectively. The inverse output terminal/Q of the flip-flop 359 generates the light-load signal $S_L$. The clock input terminals C of the flip-flops 351~359 receive the pulse signal PLS generated by the PWM circuit 500 (shown in FIG. 3).

The power management circuit 300 further includes an operational amplifier 320 and a comparator 330. A positive input terminal of the operational amplifier 320 is supplied with the threshold signal $V_{TH}$. A negative input terminal of the operational amplifier 320 receives the input signal $V_{RMS}$ through a resistor 311. A resistor 312 is coupled between the negative input terminal of the operational amplifier 320 and an output terminal of the operational amplifier 320. Thus, the threshold signal $V_{TH}$ is programmed by the input signal $V_{RMS}$ through the amplifier 320. The output terminal of the operational amplifier 320 is coupled to a positive input terminal of the comparator 330. A negative input terminal of the comparator 330 is supplied with the error signal $V_{COM}$. The output terminal of the comparator 330 is coupled to the reset terminals of the flip-flops 351~359 to reset the flip-flops 351~359 for control the light-load signal $S_L$. Thus, the light-load signal $S_L$ is generated for disabling the third transistor 70 and the fourth transistor 75 (shown in FIG. 2) in response to the error signal $V_{COM}$ and the threshold signal $V_{TH}$.

Figure 6:
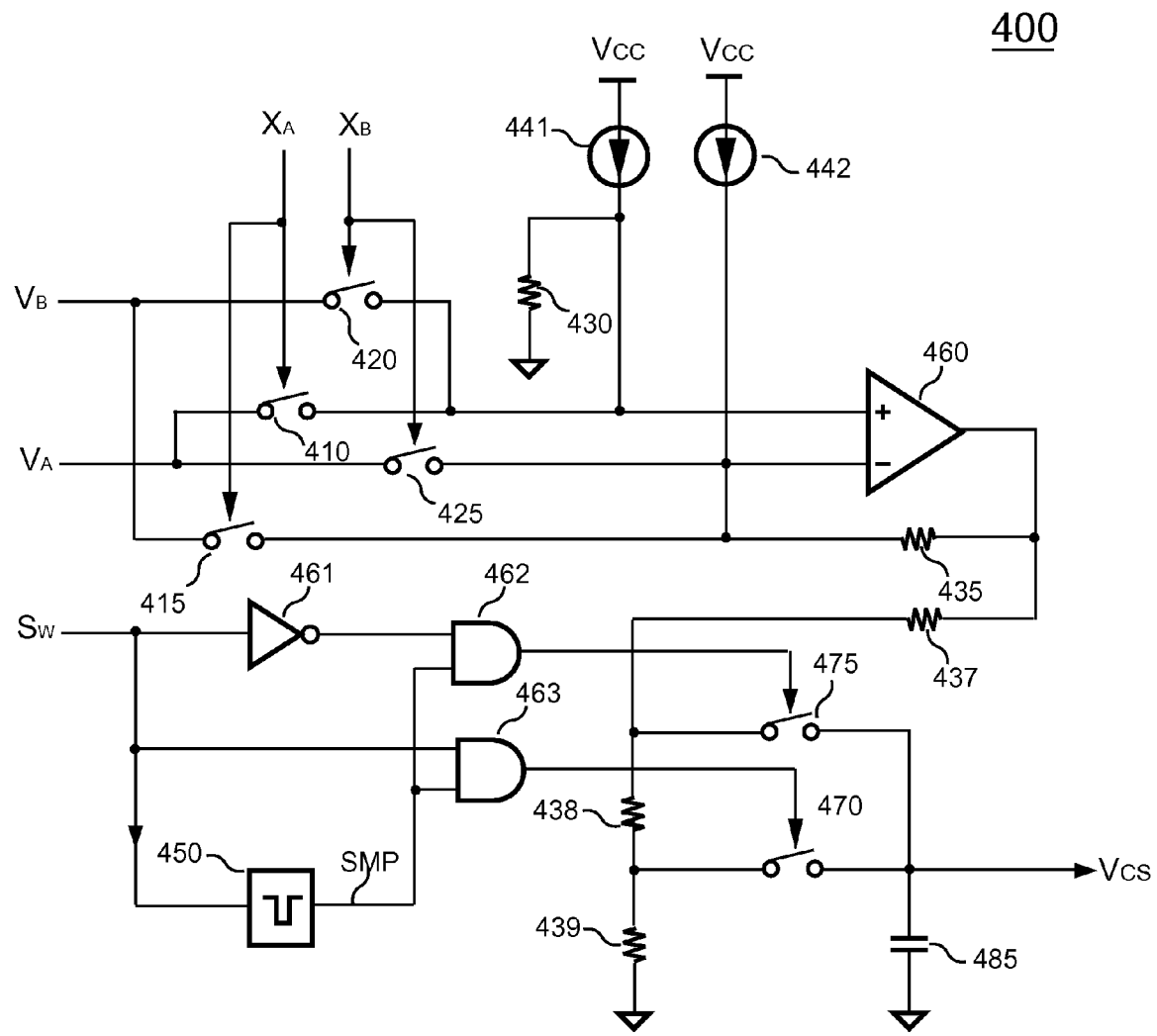
FIG. 6 shows the circuit schematic of a preferred embodiment of the differential amplifier according to the present invention.

FIG. 6 shows the circuit schematic illustrating one embodiment of the differential amplifier 400 according to the present invention. The differential amplifier 400 generates the current signal $V_{CS}$ in response to the first-current signal $V_A$ and the second-current signal $V_B$. A positive input terminal of an operational amplifier 460 receives the first-current signal $V_A$ or the second-current signal $V_B$ through switches 410 and 420. A negative input terminal of the operational amplifier 460 receives the second-current signal $V_B$ or the first-current signal $V_A$ through switches 415 and 425. The first-enable signal $X_A$ is coupled to control the switches 410 and 415. The second-enable signal $X_B$ is coupled to control the switches 420 and 425. Therefore, the polarity of the differential amplifier 400 is controlled by the first-enable signal $X_A$ and the second-enable signal $X_B$.

A resistor 435 is coupled between the negative input terminal of the operational amplifier 460 and an output terminal of the operational amplifier 460. A current source 441 is coupled between the supply voltage $V_{CC}$ and the positive input terminal of the operational amplifier 460. A resistor 430 is coupled between the current source 441 and the ground. A current source 442 is coupled between the supply voltage $V_{CC}$ and the negative input terminal of the operational amplifier 460.

Three resistors 437, 438 and 439 are coupled in series and connected between the output terminal of the operational amplifier 460 and the ground. A first terminal of a switch 470 is coupled to a joint of the resistors 438 and 439. A second terminal of the switch 470 is coupled to a first terminal of a capacitor 485. A second terminal of the capacitor 485 is coupled to the ground. The capacitor 485 is utilized to generate the current signal $V_{CS}$. A first terminal of a switch 475 is coupled to a joint of the resistors 437 and 438. A second terminal of the switch 475 is coupled to the first terminal of the capacitor 485.

Resistors 437, 438 and 439 determine the gain (attenuation) of the differential amplifier 400, and the gain of the differential amplifier 400 is controlled by the switching signal $S_W$ generated by the PWM circuit 500. The switching signal $S_W$ is coupled to control the switches 470 and 475 through an inverter 461, a signal generator 450 and two AND gates 462 and 463. An input terminal of the inverter 461 is coupled to receive the switching signal $S_W$. An output terminal of the inverter 461 is coupled to a first input terminal of the AND gate 462. A second input terminal of the AND gate 462 is coupled to the signal generator 450 to receives a signal SMP generated by the signal generator 450. An output terminal of the AND gate 462 controls the switch 475. The signal generator 450 is coupled to receive the switching signal $S_W$ to generate the signal SMP. A first input terminal of the AND gate 463 receives the switching signal $S_W$. A second input terminal of the AND gate 463 is coupled to the signal generator 450 to receives the signal SMP. An output terminal of the AND gate 463 controls the switch 470.

Figure 7:
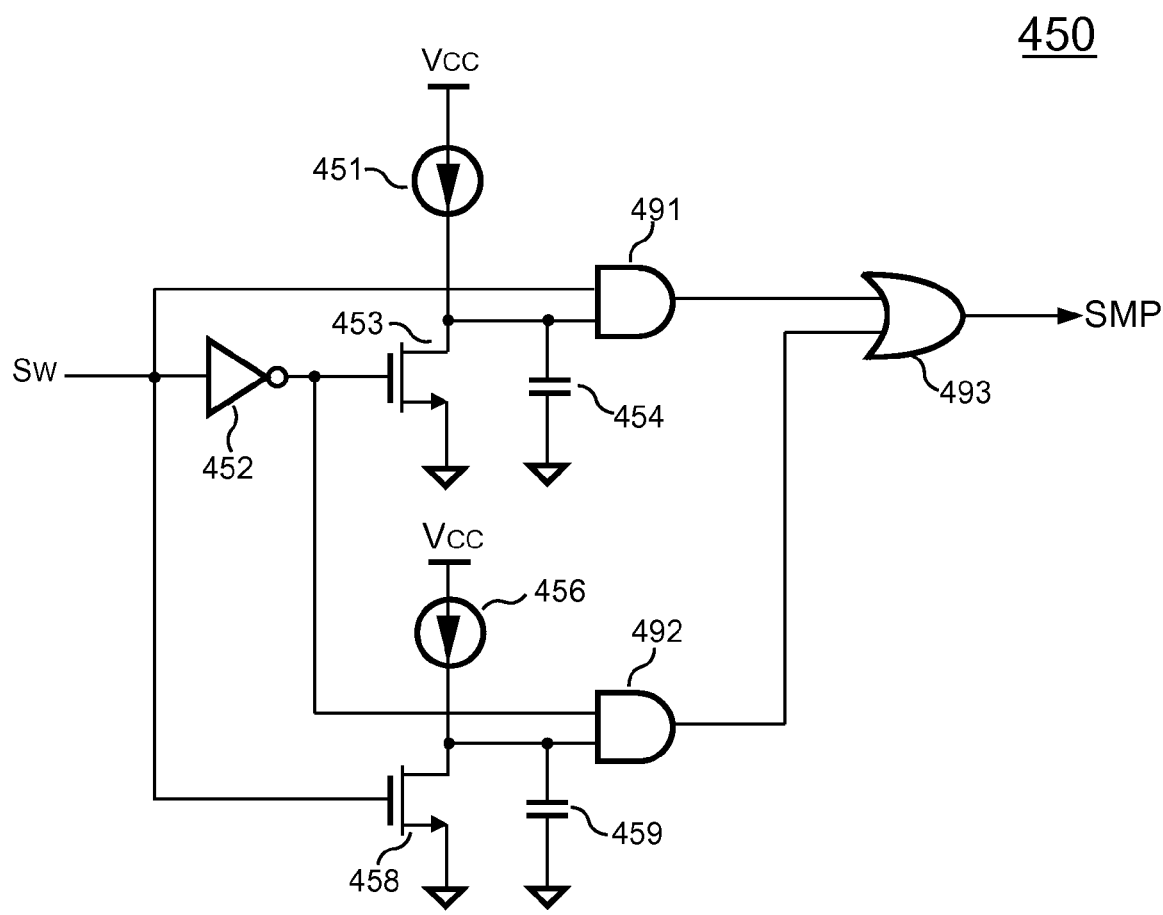
FIG. 7 shows the circuit schematic of a preferred embodiment of the signal generator according to the present invention.

FIG. 7 shows the circuit schematic illustrating one embodiment of the signal generator 450 according to the present invention. As shown, the signal generator 450 comprises an inverter 452, a first generator, a second generator, and an OR gate 493. The first generator includes a constant current source 451, a transistor 453, a capacitor 454, and an AND gate 491. An input terminal of the inverter 452 receives the switching signal $S_W$. An output terminal of the inverter 452 is coupled to the gate of the transistor 453. The gate of the transistor 453 receives the switching signal $S_W$ through the inverter 452. The constant current source 451 is connected between the drain of the transistor 453 and the supply voltage $V_{CC}$. The source of the transistor 453 is coupled to the ground. The capacitor 454 is connected between the drain of the transistor 453 and the ground. A first input terminal of the AND gate 491 is connected to the capacitor 454. A second input terminal of the AND gate 491 receives the switching signal $S_W$.

The second generator includes a constant current source 456, a transistor 458, a capacitor 459, and an AND gate 492. The constant current source 456 is connected between the drain of the transistor 458 and the supply voltage $V_{CC}$. The gate of the transistor 458 receives the switching signal $S_W$. The source of the transistor 458 is coupled to the ground. The capacitor 459 is connected between the drain of the transistor 458 and the ground. A first input terminal of the AND gate 492 is connected to the capacitor 459. A second input terminal of the AND gate 492 receives the switching signal $S_W$ through the inverter 452. The output terminals of the AND gates 491 and 492 are coupled to a first input terminal and a second input terminal of the OR gate 493 respectively. An output terminal of the OR gate 493 generates the signal SMP.

FIG. 8 shows the circuit schematic illustrating one embodiment of the PWM circuit 500 according to the present invention. As shown, the PWM circuit 500 comprises an oscillator (OSC) 700, a flip-flop 510, an inverter 511 and an AND gate 512 for generating the switching signal $S_W$. The oscillator 700 generates the pulse signal PLS and a ramp signal. An input terminal of the inverter 511 is coupled to the oscillator 700 for receiving the pulse signal PLS. An output terminal of the inverter 511 is coupled to the clock input terminal ck of the flip-flop 510. The input terminal D of the flip-flop 510 receives the supply voltage $V_{CC}$. The output terminal Q of the flip-flop 510 is coupled to a first input terminal of the AND gate 512. A second input terminal of the AND gate 512 is coupled to the output terminal of the inverter 511. An output terminal of the AND gate 512 generates the switching signal $S_W$.

The PWM circuit 500 further comprises a comparator 520, two NAND gates 540, 541, and a blanking circuit 600. A positive input terminal of the comparator 520 is supplied with the signal $I_{COM}$. A negative input terminal of the comparator 520 is coupled to the oscillator 700 for receiving the ramp signal. An output terminal of the comparator 520 is coupled to a second input terminal of the NAND gate 540. The comparator 520 compares the ramp signal RAMP with the signal $I_{COM}$ to reset the flip-flop 510. When the signal $I_{COM}$ lower than the ramp signal RAMP, the switching signal $S_W$ is disable.

A first input terminal of the NAND gate 540 is supplied with a reset signal RST to reset the flip-flop 510. A third input terminal of the NAND gate 540 receives an over-current signal OVR. The over-current signal OVR is coupled to disable the switching signal $S_W$ for an over-current protection. An output terminal of the NAND gate 540 is coupled to a first input terminal of the NAND gate 541. A second input terminal of the NAND gate 541 is coupled to the blanking circuit 600 to receive a blanking signal BLK. An output terminal of the NAND gate 541 is coupled to the reset terminal R of the flip-flop 510 through an inverter to reset the flip-flop 510 for disabling the switching signal $S_W$. The blanking circuit 600 receives the switching signal $S_W$ to generate the blanking signal BLK.

Furthermore, a comparator 530 is utilized to generate the over-current signal OVR. The over-current signal OVR is generated by comparing the current signal $V_{CS}$ with the programmable signal $I_{MAX}$. A negative input terminal of the comparator 530 is supplied with the current signal $V_{CS}$. A positive input terminal of the comparator 530 receives the programmable signal $I_{MAX}$. An output terminal of the comparator 530 generates the over-current signal OVR. The programmable signal $I_{MAX}$ is determined by a current source 531 and the resistor 91 (shown in FIG. 2). The current source 531 is coupled between the supply voltage $V_{CC}$ and the positive input terminal of the comparator 530. A first terminal of a capacitor 532 is coupled to the current source 531 and the positive input terminal of the comparator 530. A second terminal of the capacitor 532 is coupled to the ground.

Besides, the PWM circuit 500 further includes two inverters 571, 576, two AND gates 570, 575 and two OR gates 580 and 585 for generating the first-switching signal $S_A$ and the second-switching signal $S_B$. The first-switching signal $S_A$ and the second-switching signal $S_B$ are generated in response to the switching signal $S_W$, the first-enable signal $X_A$ and the second-enable signal $X_B$. An input terminal of the inverter 571 is supplied with the first-enable signal $X_A$. An output terminal of the inverter 571 is coupled to a second input terminal of the AND gate 570. A first input terminal and a third input terminal of the AND gate 570 receives the over-current signal OVR and the second-enable signal $X_B$ respectively. A first input terminal of the OR gate 580 is coupled to the output terminal of the AND gate 512 for receiving the switching signal $S_W$. A second input terminal of the OR gate 580 is coupled to an output terminal of the AND gate 570 for generating the first-switching signal $S_A$. An input terminal of the inverter 576 is supplied with the second-enable signal $X_B$. An output terminal of the inverter 576 is coupled to a third input terminal of the AND gate 575. A first input terminal and a second input terminal of the AND gate 575 receives the over-current signal OVR and the first-enable signal $X_A$ respectively. A first input terminal of the OR gate 585 is coupled to the output terminal of the AND gate 512 for receiving the switching signal $S_W$. A second input terminal of the OR gate 585 is coupled to an output terminal of the AND gate 575 to generate the second-switching signal $S_B$.

Figure 9:
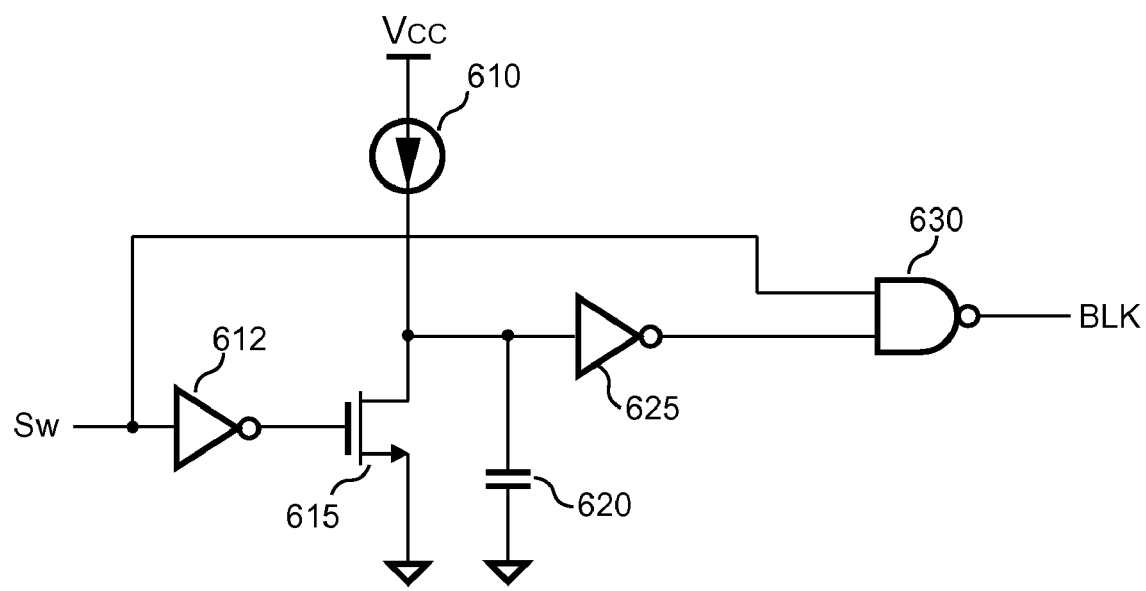
FIG. 9 shows the circuit schematic of a preferred embodiment of the blanking circuit according to the present invention.

FIG. 9 shows the circuit schematic illustrating one embodiment of the blanking circuit 600 according to the present invention. As shown, the blanking circuit 600 includes a constant current source 610, an inverter 612, a transistor 615, a capacitor 620, an inverter 625 and a NAND gate 630 for generating the blanking signal BLK. An input terminal of the inverter 612 receives the switching signal $S_W$. An output terminal of the inverter 612 is coupled to the gate of the transistor 615. The constant current source 610 is connected between the drain of the transistor 615 and the supply voltage $V_{CC}$. The source of the transistor 615 is coupled to the ground. The capacitor 620 is connected between the drain of the transistor 615 and the ground. An input terminal of the inverter 625 is coupled to the capacitor 620. An output terminal of the inverter 625 is coupled to a first input terminal of the AND gate 630. A second input terminal of the AND gate 630 receives the switching signal $S_W$. An output terminal of the AND gate 630 generates the blanking signal BLK.

FIG. 10 shows the signal waveforms according to the present invention. As shown, the phase of the first-input signal $I_A$ is same as the phase of the input voltage $V_{AC}$. The phase of the second-input signal $I_B$ is different from the phase of the input voltage $V_{AC}$ that the difference between the phase of the second-input signal $I_B$ and the phase of the input voltage $V_{AC}$ is 180°. The first-enable signal $X_A$ is enabled when the first-input signal $I_A$ is higher than the first threshold 220 (shown in FIG. 4), and meantime the second-enable signal $X_B$ is disabled. Therefore, the first-switching signal $S_A$ switches the first transistor 30 according to the switching signal $S_W$, and the second-switching signal $S_B$ is enabled to turn on the second transistor 35 (shown in FIG. 2) for achieving high efficiency. The same as above, the second-enable signal $X_B$ is enabled when the second-input signal $I_B$ is higher than the second threshold 240 (shown in FIG. 4), and meantime the first-enable signal $X_A$ is disabled. Therefore, the second-switching signal $S_B$ switches the second transistor 35 according to the switching signal $S_W$, and the first-switching signal $S_A$ is enabled to turn on the first transistor 30 (shown in FIG. 2) for achieving high efficiency.

Figure 11:
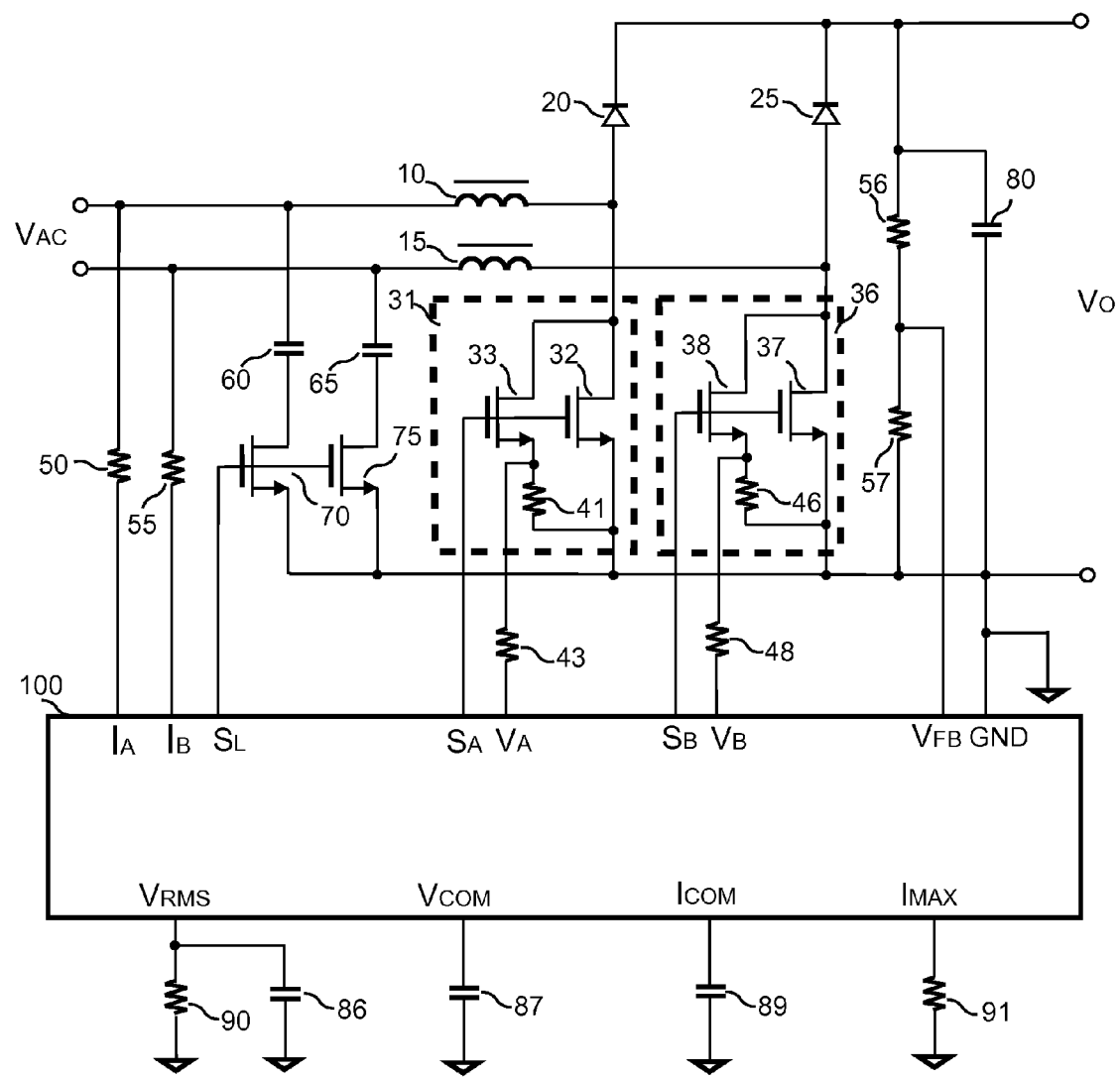
FIG. 11 shows another preferred embodiment of the bridgeless PFC power converter according to the present invention.

FIG. 11 shows the circuit schematic illustrating another preferred embodiment of the bridgeless PFC power converter. Most of the circuits of this embodiment are the same as the first embodiment and no more description here, the main difference compared to the first embodiment is that the PFC power converter of this embodiment includes a first-sense transistor 31 and a second-sense transistor 36. The first-sense transistor 31 and the second-sense transistor 36 are used for sense transistors. The first-sense transistor 31 is coupled to the first inductor 10 and the first diode 20. The second-sense transistor 36 is coupled to the second inductor 15 and the second diode 25. The first-sense transistor 31 and the second-sense transistor 36 are further coupled to the ground terminal.

The first-sense transistor 31 includes a first transistor 32, a second transistor 33 and a resistor 41. A sense-terminal of the first-sense transistor 31 is a joint of the second transistor 33 and the resistor 41 for producing the first-current signal $V_A$ from the second transistor 33 and the resistor 41. The magnitude of the first-current signal $V_A$ is correlated to the current flowed through the first transistor 32 of the first-sense transistor 31. The drains of the transistors 32 and 33 are connected together. The gates of the transistors 32 and 33 are connected to the control circuit 100 and driven by the first-switching signal $S_A$. The source of the first transistor 32 is coupled to the ground terminal. The resistor 41 is coupled between the source of the first transistor 32 and the source of the second transistor 33. The source of the second transistor 33 is further coupled to the resistor 43 for generating the first-current signal $V_A$.

The second-sense transistor 36 includes a first transistor 37, a second transistor 38 and a resistor 46. A sense-terminal of second-sense transistor 36 is a joint of the second transistor 38 and the resistor 46 for producing the second-current signal $V_B$ from the second transistor 38 and the resistor 46. The magnitude of the second-current signal $V_B$ is correlated to the current flowed through the first transistor 37 of the second-sense transistor 36. The drains of the transistors 37 and 38 are connected together. The gates of the transistors 37 and 38 are connected to the control circuit 100 and driven by the second-switching signal $S_B$. The source of the first transistor 37 is coupled to the ground. The resistor 46 is coupled between the source of the first transistor 37 and the source of the second transistor 38. The source of the second transistor 38 is further coupled to the resistor 46 for generating the second-current signal $V_B$.

Furthermore, the first-switching signal $S_A$ switches the first-sense transistor 31 in response to the switching signal $S_W$ (shown in FIG. 10) and the second-switching signal $S_B$ will turn on the second-sense transistor 36. Once the second-switching signal $S_B$ switches the second-sense transistor 36 in response to the switching signal Sw, the first-switching signal $S_A$ will turn on the first-sense transistor 31.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A bridgeless PFC power converter comprising:
a first inductor, coupled from a first input-terminal to a first transistor;
a second inductor, coupled from a second input-terminal to a second transistor;
a first diode, coupled from the first transistor to an output capacitor;
a second diode, coupled from the second transistor to the output capacitor, in which the first transistor, the second transistor and the output capacitor are further coupled to a ground terminal;
a first capacitor, coupled from the first input-terminal to the ground terminal through a third transistor;
a second capacitor, coupled from the second input-terminal to the ground terminal through a fourth transistor; and
a control circuit, coupled to the output capacitor to receive a feedback signal, the control circuit coupled to the first input-terminal and the second-input terminal to receive a first-input signal and a second-input signal, the control circuit coupled to the first transistor and the second transistor for detecting a first-current signal and a second-current signal;
wherein the control circuit generates a first-switching signal and a second-switching signal to control the first transistor and the second transistor in response to the feedback signal, the first-input signal, the second-input signal, the first-current signal and the second-current signal, the second-switching signal will turn on the second transistor when the first-switching signal switches the first transistor, the first-switching signal will turn on the first transistor when the second-switching signal switches the second transistor; the control circuit further generates a light-load signal to turn off the third transistor and the fourth transistor during a light-load of the PFC power converter.

2. The bridgeless PFC power converter as claimed in claim 1, wherein the control circuit generates an error signal in response to the feedback signal and a reference signal, the light-load signal is generated in response to the error signal and a threshold signal.

3. The bridgeless PFC power converter as claimed in claim 2, wherein the control circuit generates an input signal in response to the first-input signal and the second-input signal.

4. The bridgeless PFC power converter as claimed in claim 3, wherein the threshold signal is programmed by the input signal.

5. The bridgeless PFC power converter as claimed in claim 1, wherein the control circuit comprises an arbiter circuit to generate a first-enable signal when the first-input signal is higher than a first threshold, the arbiter circuit generates a second-enable signal once the second-input signal is higher than a second threshold, the first-enable signal and the second-enable signal are exclusive, the first-enable signal and the second-enable signal are utilized for generating the first-switching signal and the second-switching signal.

6. The bridgeless PFC power converter as claimed in claim 1, wherein the control circuit comprises a differential amplifier to generate a current signal for controlling the first-switching signal and the second-switching signal in response to the first-current signal and the second-current signal, the polarity of the differential amplifier is controlled by a first-enable signal and a second-enable signal.

7. The bridgeless PFC power converter as claimed in claim 1, wherein the control circuit generates a switching signal in accordance with an error signal, a current signal and an input signal; the first-switching signal and the second-switching signal are generated in response to the switching signal, a first-enable signal and a second-enable signal.

8. The bridgeless PFC power converter as claimed in claim 7, wherein the control circuit generates an over-current signal by comparing the current signal with a programmable signal, the programmable signal is determined by a current source and a resistor, the over-current signal is coupled to disable the switching signal.

9. The bridgeless PFC power converter as claimed in claim 7, wherein the first-switching signal switches the first transistor in response to the switching signal and the second-switching signal will turn on the second transistor, the second-switching signal switches the second transistor in response to the switching signal and the first-switching signal will turn on the first transistor.

10. A bridgeless PFC power converter comprising:
a first inductor, coupled from a first input-terminal to a first-sense transistor;
a second inductor, coupled from a second input-terminal to a second-sense transistor;

a first diode, coupled from the first-sense transistor to an output capacitor;

a second diode, coupled from the second-sense transistor to the output capacitor, in which the first-sense transistor, the second-sense transistor and the output capacitor are further coupled to a ground terminal;

a control circuit, coupled to the output capacitor to receive a feedback signal, the control circuit coupled to the first input-terminal and the second input-terminal to receive a first-input signal and a second-input signal, the control circuit coupled to the first-sense transistor and the second-sense transistor for detecting a first-current signal and a second-current signal;

a first capacitor, coupled from the first input-terminal to the ground terminal through a third transistor; and a second capacitor, coupled from the second input-terminal to the ground terminal through a fourth transistor;

wherein the control circuit generates a first-switching signal and a second-switching signal to control the first-sense transistor and the second-sense transistor in response to the feedback signal, the first-input signal, the second-input signal, the first-current signal and the second-current signal, the first-sense transistor has a sense-terminal to output the first-current signal, the second-sense transistor has a sense-terminal to output the second-current signal, the magnitude of the first-current signal is correlated to a current flowed through the first-sense transistor, the magnitude of the second-current signal is correlated to a current flowed through the second-sense transistor, the second-switching signal will turn on the second-sense transistor when the first-switching signal switches the first-sense transistor, the first-switching signal will turn on the first-sense transistor when the second-switching signal switches the second-sense transistor; the control circuit further generates a light-load signal to turn off the third transistor and the fourth transistor during a light-load of the PFC power converter.

11. The bridgeless PFC power converter as claimed in claim 10, wherein the control circuit generates an error signal in response to the feedback signal and a reference signal, the light-load signal is generated in response to the error signal and a threshold signal, the control circuit further generates an input signal in response to the first-input signal and the second-input signal, the threshold signal is programmed by the input signal.

12. A bridgeless PFC power converter comprising:
a first inductor, coupled from a first input-terminal to a first-sense transistor;
a second inductor, coupled from a second input-terminal to a second-sense transistor;
a first diode, coupled from the first-sense transistor to an output capacitor;
a second diode, coupled from the second-sense transistor to the output capacitor, in which the first-sense transistor, the second-sense transistor and the output capacitor are further coupled to a ground terminal; and
a control circuit, coupled to the output capacitor to receive a feedback signal, the control circuit coupled to the first input-terminal and the second input-terminal to receive a first-input signal and a second-input signal, the control circuit coupled to the first-sense transistor and the second-sense transistor for detecting a first-current signal and a second-current signal;
wherein the control circuit generates a first-switching signal and a second-switching signal to control the first-sense transistor and the second-sense transistor in response to the feedback signal, the first-input signal, the second-input signal, the first-current signal and the second-current signal, the first-sense transistor has a sense-terminal to output the first-current signal, the second-sense transistor has a sense-terminal to output the second-current signal, the magnitude of the first-current signal is correlated to a current flowed through the first-sense transistor, the magnitude of the second-current signal is correlated to a current flowed through the second-sense transistor, the second-switching signal will turn on the second-sense transistor when the first-switching signal switches the first-sense transistor, the first-switching signal will turn on the first-sense transistor when the second-switching signal switches the second-sense transistor;
wherein the control circuit comprises an arbiter circuit to generate a first-enable signal when the first-input signal is higher than a first threshold, the arbiter circuit generates a second-enable signal once the second-input signal is higher than a second threshold, the first-enable signal and the second-enable signal are exclusive, the first-enable signal and the second-enable signal are utilized for generating the first-switching signal and the second-switching signal.

13. A bridgeless PFC power converter comprising:
a first inductor, coupled from a first input-terminal to a first-sense transistor;
a second inductor, coupled from a second input-terminal to a second-sense transistor;
a first diode, coupled from the first-sense transistor to an output capacitor;
a second diode, coupled from the second-sense transistor to the output capacitor, in which the first-sense transistor, the second-sense transistor and the output capacitor are further coupled to a ground terminal; and
a control circuit, coupled to the output capacitor to receive a feedback signal, the control circuit coupled to the first input-terminal and the second input-terminal to receive a first-input signal and a second-input signal, the control circuit coupled to the first-sense transistor and the second-sense transistor for detecting a first-current signal and a second-current signal;
wherein the control circuit generates a first-switching signal and a second-switching signal to control the first-sense transistor and the second-sense transistor in response to the feedback signal, the first-input signal, the second-input signal, the first-current signal and the second-current signal, the first-sense transistor has a sense-terminal to output the first-current signal, the second-sense transistor has a sense-terminal to output the second-current signal, the magnitude of the first-current signal is correlated to a current flowed through the first-sense transistor, the magnitude of the second-current signal is correlated to a current flowed through the second-sense transistor, the second-switching signal will turn on the second-sense transistor when the first-switching signal switches the first-sense transistor, the first-switching signal will turn on the first-sense transistor when the second-switching signal switches the second-sense transistor;
wherein the control circuit comprises a differential amplifier to generate a current signal for controlling the first-switching signal and the second-switching signal in response to the first-current signal and the second-current signal, the polarity of the differential amplifier is controlled by a first-enable signal and a second-enable signal.

14. A bridgeless PFC power converter comprising:
a first inductor, coupled from a first input-terminal to a first-sense transistor;
a second inductor, coupled from a second input-terminal to a second-sense transistor;
a first diode, coupled from the first-sense transistor to an output capacitor;
a second diode, coupled from the second-sense transistor to the output capacitor, in which the first-sense transistor, the second-sense transistor and the output capacitor are further coupled to a ground terminal; and
a control circuit, coupled to the output capacitor to receive a feedback signal, the control circuit coupled to the first input-terminal and the second input-terminal to receive a first-input signal and a second-input signal, the control circuit coupled to the first-sense transistor and the second-sense transistor for detecting a first-current signal and a second-current signal;
wherein the control circuit generates a first-switching signal and a second-switching signal to control the first-sense transistor and the second-sense transistor in response to the feedback signal, the first-input signal, the second-input signal, the first-current signal and the second-current signal, the first-sense transistor has a sense-terminal to output the first-current signal, the second-sense transistor has a sense-terminal to output the second-current signal, the magnitude of the first-current signal is correlated to a current flowed through the first-sense transistor, the magnitude of the second-current signal is correlated to a current flowed through the second-sense transistor, the second-switching signal will turn on the second-sense transistor when the first-switching signal switches the first-sense transistor, the first-switching signal will turn on the first-sense transistor when the second-switching signal switches the second-sense transistor;
wherein the control circuit generates a third switching signal in accordance with an error signal, a current signal and an input signal, the first-switching signal and the second-switching signal are generated in response to a first-enable signal, a second-enable signal and the third switching signal.

15. The bridgeless PFC power converter as claimed in claim 14, wherein the control circuit generates an over-current signal by comparing the current signal with a programmable signal, the programmable signal is determined by a current source and a resistor, the over-current signal is coupled to disable the third switching signal.

16. The bridgeless PFC power converter as claimed in claim 14, wherein the first-switching signal switches the first-sense transistor in response to the third switching signal and the second-switching signal will turn on the second-sense transistor, the second-switching signal switches the second-sense transistor in response to the third switching signal and the first-switching signal will turn on the first-sense transistor.

17. A bridgeless PFC power converter comprising:
a first inductor, coupled from a first input-terminal to a first-sense transistor;
a second inductor, coupled from a second input-terminal to a second-sense transistor;
a first diode, coupled from the first-sense transistor to an output capacitor;
a second diode, coupled from the second-sense transistor to the output capacitor, in which the first-sense transistor, the second-sense transistor and the output capacitor are further coupled to a ground terminal; and
a control circuit, coupled to the output capacitor to receive a feedback signal, the control circuit coupled to the first input-terminal and the second input-terminal to receive a first-input signal and a second-input signal, the control circuit coupled to the first-sense transistor and the second-sense transistor for detecting a first-current signal and a second-current signal;
wherein the control circuit generates a first-switching signal and a second-switching signal to control the first-sense transistor and the second-sense transistor in response to the feedback signal, the first-input signal, the second-input signal, the first-current signal and the second-current signal, the first-sense transistor has a sense-terminal to output the first-current signal, the second-sense transistor has a sense-terminal to output the second-current signal, the magnitude of the first-current signal is correlated to a current flowed through the first-sense transistor, the magnitude of the second-current signal is correlated to a current flowed through the second-sense transistor, the second-switching signal will turn on the second-sense transistor when the first-switching signal switches the first-sense transistor, the first-switching signal will turn on the first-sense transistor when the second-switching signal switches the second-sense transistor;
each sense transistor comprises:
a first transistor, coupled to the first inductor or the second inductor;
a second transistor, coupled to the first transistor and the control circuit; and
a resistor, coupled between the first transistor and the second transistor;
wherein the sense-terminal is a joint of the second transistor and the resistor to sense the current flowed through the first transistor of the sense transistor and output the first-current signal or the second-current signal, the magnitude of the first-current signal or the second-current signal is correlated to the current flowed through the first transistor of the sense transistor.

* * * * *